(12) United States Patent
Steffens et al.

(10) Patent No.: US 12,018,736 B2
(45) Date of Patent: Jun. 25, 2024

(54) GROUP TRANSMISSION DEVICE, IN PARTICULAR SPLIT TRANSMISSION

(71) Applicant: Daimler Truck AG, Leinfelden-Echterdingen (DE)

(72) Inventors: Frank Steffens, Ostfildern (DE); Marc Stroelin, Neuhausen (DE); Jens Luckmann, Winnenden (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 0 days.

(21) Appl. No.: 17/768,744

(22) PCT Filed: Oct. 7, 2020

(86) PCT No.: PCT/EP2020/078087
§ 371 (c)(1),
(2) Date: Apr. 13, 2022

(87) PCT Pub. No.: WO2021/073968
PCT Pub. Date: Apr. 22, 2021

(65) Prior Publication Data
US 2024/0141972 A1    May 2, 2024

(30) Foreign Application Priority Data
Oct. 14, 2019    (DE) ...................... 10 2019 007 129.8

(51) Int. Cl.
*F16H 37/04*    (2006.01)
*F16H 3/52*    (2006.01)
(Continued)

(52) U.S. Cl.
CPC ............. *F16H 37/046* (2013.01); *F16H 3/52* (2013.01); *F16H 57/0025* (2013.01);
(Continued)

(58) Field of Classification Search
CPC .. F16H 37/046; F16H 37/065; F16H 37/0826; F16H 37/0833; F16H 2037/048
See application file for complete search history.

(56) References Cited

U.S. PATENT DOCUMENTS

| 7,288,044 | B2 | 10/2007 | Gumpoltsberger |
| 10,493,839 | B2 * | 12/2019 | Kaltenbach ............. F16H 3/095 |

(Continued)

FOREIGN PATENT DOCUMENTS

| DE | 101 45 519 A1 | 4/2003 |
| DE | 102 60 179 A1 | 7/2004 |

(Continued)

OTHER PUBLICATIONS

PCT/EP2020/078087, International Search Report dated Dec. 1, 2020 (Two (2) pages).

*Primary Examiner* — Huan Le
(74) *Attorney, Agent, or Firm* — Crowell & Moring LLP

(57) ABSTRACT

A group transmission device includes a main transmission which has a main shaft, a countershaft and a spur gear pair which includes a first spur gear arranged coaxially and axially overlapping with the main shaft and a second spur gear arranged coaxially and axially overlapping with the countershaft. A range group has a first shaft non-rotationally connected to the main shaft, a second shaft non-rotationally connected to a transmission output shaft, a third shaft and a blocking switching unit. A first switching unit non-rotationally connects the third shaft to a housing. A second switching unit has an axially shiftable switching element and non-rotationally connects the third shaft to the first spur gear. The main shaft is coupled non-rotationally to a transmission input shaft. A third switching unit has an axially shiftable further switching element and non-rotationally connects the first spur gear to the first shaft of the range group.

11 Claims, 1 Drawing Sheet

(51) Int. Cl.
  *F16H 37/06* (2006.01)
  *F16H 37/08* (2006.01)
  *F16H 57/00* (2012.01)

(52) U.S. Cl.
  CPC .... *F16H 37/065* (2013.01); *F16H 2037/0873* (2013.01); *F16H 57/0037* (2013.01)

(56) References Cited

U.S. PATENT DOCUMENTS

| | | | |
|---|---|---|---|
| 10,967,725 B2 * | 4/2021 | Kaltenbach | B60K 6/36 |
| 10,982,735 B1 * | 4/2021 | Kim | F16H 37/046 |
| 11,009,102 B2 | 5/2021 | Steffens et al. | |

FOREIGN PATENT DOCUMENTS

| | | |
|---|---|---|
| DE | 103 15 313 A1 | 1/2005 |
| DE | 10 2004 046 074 A1 | 4/2006 |
| DE | 10 2007 033 727 A1 | 2/2008 |
| DE | 10 2017 007 763 A1 | 2/2019 |
| RU | 2 652 485 C1 | 4/2018 |
| SU | 1146217 A | 3/1985 |
| WO | WO 2016/053171 A1 | 4/2016 |

* cited by examiner

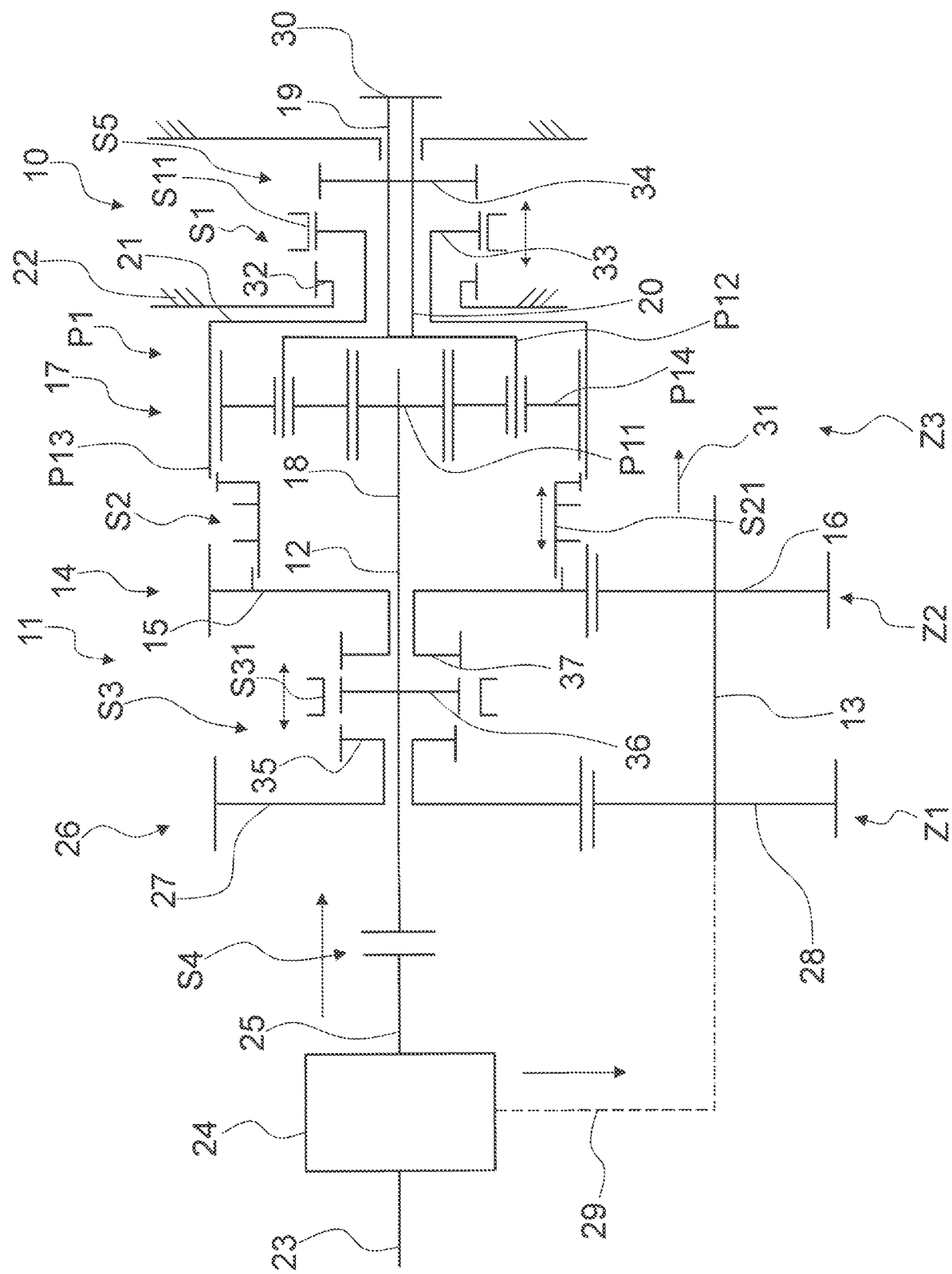

GROUP TRANSMISSION DEVICE, IN PARTICULAR SPLIT TRANSMISSION

BACKGROUND AND SUMMARY OF THE INVENTION

The invention relates to a group transmission device, in particular a split transmission.

A group transmission device is already known from DE 103 15 313 A1, having a main transmission, which has a main shaft, a countershaft and a spur gear pair, which comprises a first spur gear arranged coaxially and axially overlapping with the main shaft and a second spur gear arranged coaxially and axially overlapping with the countershaft, having a range transmission arranged coaxially to the main shaft in a planetary construction, which has a first shaft non-rotationally connected to the main shaft, a second shaft non-rotationally connected to a transmission output shaft, a third shaft and a blocking switching unit, having a first switching unit which is provided to connect the third shaft non-rotationally to a housing, and having a second switching unit which is provided to connect the third shaft non-rotationally to the first spur gear or to the second spur gear, wherein the main shaft is coupled or can be coupled non-rotationally to a transmission input shaft.

Group transmission devices are also known from DE 101 45 519 A1, DE 102 60 179 A1 and DE 10 2004 046 074 A1. Furthermore, a group transmission device, in particular a load-switchable split transmission, is known from DE 10 2017 007 763 A1.

In particular, the object of the invention is to provide an advantageously variable and flexible group transmission device.

The invention is based on a group transmission device, in particular on a split transmission, having a main transmission, which has a main shaft, a countershaft and a spur gear pair, which comprises a first spur gear arranged coaxially and axially overlapping with the main shaft and a second spur gear arranged coaxially and axially overlapping with the countershaft, having a range group arranged coaxially to the main shaft in a planetary construction, which has a first shaft non-rotationally connected to the main shaft, a second shaft non-rotationally connected to a transmission output shaft, a third shaft and a blocking switching unit, having a first switching unit which is provided to connect the third shaft non-rotationally to a housing, and having a second switching unit which is provided to connect the third shaft non-rotationally to the first spur gear or to the second spur gear, wherein the main shaft is coupled or can be coupled non-rotationally to a transmission input shaft.

It is proposed that the group transmission device has a third switching unit, which has exactly one axially shiftable further switching element and which is provided to connect the first spur gear non-rotationally to the first shaft of the range group. In particular, an advantageously flexibly switchable group transmission device can be provided by the design of the group transmission device according to the invention. In particular, a spur gear pair can be used for a power-branched operation, in which, on one hand, power, in particular rotational moment, is introduced into the range group via the countershaft and, in particular simultaneously, on the other hand power is introduced int the range group via the main shaft. Furthermore, the spur gear pair can advantageously also be used in a non-power branched operation, in which power only flows via the first power path. Preferably, a hollow gear can be attached to the planetary carrier by means of the blocking switching unit, such that the toothed gear can be released in a lower transmission group and thus is further available for the translation formation.

Preferably, the third shaft is connected permanently non-rotationally to a hollow gear of the range group. The hollow gear can preferably, in particular via a shifting sleeve, be attached to the planets by means of the blocking switching element, such that the toothed gear can be released in the lower transmission group and is thus further available for the translation formation. Preferably, the range group is formed from a planetary transmission. In particular, the range group has at least one, in particular exactly one, planetary gear set.

"Group transmission device" is to be understood, in particular, as at least one part of a group transmission. Alternatively, the group transmission device can completely form the group transmission. The group transmission device in particular has a main transmission, preferably a main group, which preferably comprises an intermediary shaft. However, it would also be conceivable that the main group is free of an intermediary shaft. The main group can comprise, in particular, a plurality of gears. Preferably, the main group is provided for switching a plurality of gears. Advantageously, the group transmission device has at least one reducing transmission, particularly advantageously at least two reducing transmissions and, particularly preferably, a range group and a pre-switching group. Preferably, the group transmission device is provided, in particular for HGVs, in particular when formed as a power split group transmission device, for distributing a drive moment to a main shaft and to at least one countershaft, wherein the countershaft is recoupled to the main shaft, in particular on an end. Preferably, one of the paths has switchable toothed gears, wherein the path with the switchable toothed gears in particular has means for reducing or increasing the rotational torque of this route. Preferably, at last one switchable toothed gear and/or its path can be made free of rotational torque via the means, while the other route still transfers rotational torque. In doing so, the gear switching, in particular, can be made possible without interrupting the rotational torque. "Provided" is to be understood, in particular, as specifically designed and/or equipped. An object being provided for a specific function is to be understood, in particular, as the object fulfilling and/or carrying out this specific function in at least one application and/or operating state.

In this context, a "spur gear pair" is to be understood, in particular, as a pair of two spur gear toothed gears which are permanently in toothed engagement with each other. A "planetary gear set" is to be understood, in particular, as a unit of a planetary transmission with a transmission element formed as a sun gear, having a transmission element formed as a hollow gear, having a transmission element formed as a planetary support and having several transmission elements formed as a planetary support, wherein the transmission elements formed as a planetary support of the transmission element formed as a planetary support are arranged on an orbit around the transmission element formed as a sun gear. A "planetary transmission" is to be understood, in particular, as a unit having at least one planetary gear set, preferably having exactly one planetary gear set. Alternatively or additionally, the planetary transmission can be formed with multiple levels and can preferably comprise several planetary gear sets.

"Coupled" is to be understood as coupled, in particular via at least one gear transmission ratio, or coupled non-rotationally, advantageously permanently non-rotationally, advantageously via at least one shaft and/or at least one toothing. Advantageously, "coupled" is to be understood as coupled via a maximum of one gear transmission ratio or coupled non-rotationally, in particular advantageously permanently non-rotationally, particularly advantageously via at most one shaft and/or at most one toothing. In particular, a "switching unit" is to be understood as a unit having at least two coupling elements and at least one switching element, which is provided to produce a switchable connection between the at least two coupling elements. Preferably at least one of the switching units is formed by a switching unit with three coupling elements. A "switching element" of a switching unit is to be understood, in particular, as an element which is preferably formed axially shiftably and, in at least one operating state, in particular at least one switching position of the switching unit, is provided for a non-rotational coupling of the at least two coupling elements. A "coupling element" is to be understood, in particular, as an element connected permanently non-rotationally to a transmission element, such as a transmission shaft, for example, an idler, a fixed gear and/or an axis, which is preferably fixed axially and radially and which is provided for a frictionally engaged, force-fit and/or form-fit connection to the switching element, such as an idler, for example, which has a toothing for connecting to the switching element. A "switching unit having three coupling elements" is to be understood, in particular, as a switching unit in which the switching element is provided to switchably connect a coupling element, in particular an inner coupling element, in each case to at least one of the two other coupling elements and to decouple it from these. In this context, "non-rotational" is to be understood, in particular, as a non-rotational connection of the second components.

A non-rotational connection and a non-rotational coupling of two rotatably mounted elements is to be understood in such a way that the two elements are arranged coaxially in relation to each other and are connected to each other in such a way that they rotate with the same angular speed. A non-rotational connection of a rotatably mounted element having a housing is to be understood as the element being connected to the housing in such a way that it cannot twist in relation to the housing.

Furthermore, it is proposed that the range group has exactly three shafts, namely the first shaft, the second shaft and the third shaft. Preferably, the first shaft is non-rotationally connected to the main shaft and forms an input shaft of the range group. Preferably, the second shaft is non-rotationally connected to a transmission output shaft and forms an output shaft of the range group. Particularly preferably, the third shaft is permanently non-rotationally connected to a hollow gear of the range group. Thus, an advantageous range group, in particular, can be provided.

Furthermore, it is proposed that the group transmission device has a pre-switching group pre-switched in relation to the main shaft, which has a further shaft, which is non-rotationally connected to the main shaft or can be non-rotationally connected to the main shaft via a fourth switching element. Thus, an advantageous group transmission device can be provided. In particular, a switch is possible without load interruption by a pre-switching group and combined gearwheels within the gears implemented by the gearwheels.

It is further proposed that the third switching unit is provided to couple the main shaft to the second spur gar. Preferably, the third switching unit is formed from a switching unit with three coupling elements, which is provided to couple the main shaft to the second spur gear or a fourth spur gear. Preferably, the group transmission device has a second spur gear pair, which comprises a third spur gear arranged coaxially and axially overlapping with the main shaft and fourth spur gear arranged coaxially and axially overlapping with the countershaft. Thus, an advantageous group transmission device can be provided.

It is further proposed that the range group has a sun gear, wherein the first shaft is non-rotationally fixed to the sun gear. Preferably, the range group has a sun gear, a hollow gear, a planetary support and several planetary gears, wherein the planetary gears of the planetary support are arranged in an orbit around the sun gear. Furthermore, it is proposed that the range group has a planetary support, wherein the second shaft is non-rotationally connected to the planetary support. Furthermore, it is proposed that the range group has a hollow gear, wherein the third shaft is non-rotationally coupled to the hollow gear. Thus, an advantageous group transmission device can be provided.

Furthermore, it is proposed that the blocking switching unit is provided to non-rotationally couple the second shaft to the third shaft. The blocking switching unit is provided, in particular, to block the range group. Thus, a blocking can be advantageously achieved, in particular.

Furthermore, it is proposed that the main shaft is formed as a solid shaft. In this context, a "solid shaft" is to be understood, in particular, as a shaft which, for reasons of saving weight and for reasons of guiding oil, can at least sectionally have an optional cavity, yet which does not have further shaft arranged coaxially and axially penetrating it in the optional cavity. Thus, an advantageously compact and stable group transmission device can be provided, in particular.

Furthermore, it is proposed that the first switching unit and the blocking switching unit are combined with a single sliding sleeve to form a double switching unit. Preferably, the double switching unit is formed as a switching unit with three coupling elements. Thus, an advantageously compact group transmission device, in particular, can be provided.

The terms "axial" and "radial" here relate, in particular, to a main axis of rotation of the group transmission device, in particular the main shaft, such that the expression "axial" refers to direction, in particular, which runs in parallel or coaxially to the main axis of rotation. Furthermore, the expression "radial" refers, in particular, to a direction which runs perpendicularly to the main axis of rotation. An "arrangement on the side of the transmission input" is to be understood, in particular, in that the component is arranged on a side of the further component, which is facing towards the transmission gear element and/or the internal combustion engine. An "arrangement on the output side of the transmission" is to be understood, in particular, in that the component is arranged on the side of the further component which is facing away from the transmission input element and/or the internal combustion engine, even if the further component is arranged after the transmission output element in the axial direction.

Further advantages and features emerge from the following description of the figure. In the Figure, an exemplary embodiment of the invention is depicted.

BRIEF DESCRIPTION OF THE DRAWING

The Figure schematically shows a group transmission device of a motor vehicle according to the invention in a schematic depiction.

DETAILED DESCRIPTION OF THE DRAWING

The Figure schematically shows a group transmission device 10 of a motor vehicle. The group transmission device 10 forms a part of a multi-step transmission, in particular of a group transmission. The group transmission device 10 has a housing 22.

The group transmission device 10 is formed as a split transmission. The group transmission device 10 is formed from a power split transmission. The group transmission device 10 has a range group 17. The range group 17 is formed as a post-switching group. The range group 17 is provided to switch between at least two, in particular between at least three, gear groups. The group transmission device 10 ha a pre-switching group 24. Furthermore, the group transmission device 10 has a main transmission 11. The main transmission 11 is arranged between the pre-switching group 24 and the range group 17.

The group transmission device 10 comprises a transmission input shaft 23. The transmission input shaft 23 is connected upstream of the pre-switching group 24. The transmission input shaft 23 is provided on the side of the drive to attach to a coupling not visible in any more detail, in particular a load switching coupling. The group transmission device 10 can be connected to a drive unit not depicted in further detail via a coupling, in particular a load switching coupling. The group transmission device 10 has a transmission output shaft 19. The transmission output shaft 19 is arranged coaxially in relation to the transmission input shaft 23. The transmission output shaft 19 has an output toothed gear 30. The output toothed gear 30 is coupled, for example, to an axis transmission not depicted in further detail.

The group transmission device 10 has a main shaft 12. The main transmission 11 has the main shaft 12. The main shaft 12 is arranged coaxially to the transmission input shaft 23. The main shaft 12 can be non-rotationally coupled to the transmission input shaft 23. The main shaft 12 is arranged between the transmission input shaft 23 and the transmission output shaft 19. The main shaft 12 is formed as a solid shaft. The group transmission device 10 comprises a countershaft 13. The main transmission 11 has the countershaft 13. The countershaft 13 is arranged offset in parallel in relation to the main shaft 12. The countershaft 13 is formed as a solid shaft.

The group transmission device 10 comprises at least three toothed gear planes Z1, Z2, Z3.

The main transmission 11 has a spur gear pair 14. The spur gear pair 14 is arranged on the second spur gear plane Z2. The spur hear pair 14 has a first spur gear 15 arranged coaxially and axially overlapping with the main shaft 12. The first spur gear 15 is formed from an idler. Furthermore, the spur gear pair 14 has a second spur gear 16 arranged coaxially and axially overlapping with the countershaft 13. The second spur gear 16 is formed from a fixed gear. The second spur gear 16 is permanently non-rotationally connected to the countershaft 13. The first spur gear 15 of the spur gear pair 14 and the second spur gear 16 of the spur gear pair 14 are connected in a permanent meshing manner to each other. The first spur gear 15 of the spur gear pair 14 is in permanent engagement with the second spur gear 16 of the spur gear pair 14. Furthermore, the main transmission 11 has a further spur gear pair 26. The further spur gear pair 26 is arranged on the first toothed gear plane Z1. The further spur gear pair 26 has a third spur gear 27 arranged coaxially and axially overlapping with the main shaft 12. The third spur gear 27 is formed from an idler. Furthermore, the further spur gear pair 26 has a fourth spur gear 28 arranged coaxially and axially overlapping with the countershaft 13. The fourth spur gear 28 is formed from a fixed gear. The fourth spur gear 28 of the further spur gear pair is permanently non-rotationally connected to the countershaft 13. The third spur gear 27 of the further spur gear pair 26 and the fourth spur gear 28 of the further spur gear pair 26 are connected to each other in a permanently meshing manner. The third spur gear 27 of the further spur gear pair 26 is in permanent engagement with the fourth spur gear 28 of the further spur gear pair 26.

The pre-switching group 24 is connected upstream of the main shaft 12. The pre-switching group 24 is only indicated schematically. The transmission input shaft 23 forms an input side of the pre-switching group 24. The pre-switching group 24 has a further shaft 25, which is non-rotationally connected to the main shaft 12 or can be connected by means of a fourth switching unit S4. The group transmission device 10 has a fourth switching unit S4. The fourth switching unit S4 is formed from a coupling. The further shaft 25 can be connected non-rotationally to the main shaft 12 by means of the fourth switching unit S4. The fourth switching unit S4 is provided to couple the further shaft 25 to the main shaft 12. The further shaft 25 forms a first output shaft of the pre-switching group 24. The further shaft 25 forms a first power path of the group transmission device 10 from the pre-switching group 24. The pre-switching group 24 further has a second power path 29. The pre-switching group 24 can be coupled directly to the countershaft 13 of the main transmission 11 via the second power path 29. A flux of force of the group transmission device 10 formed as a power split transmission is divided in the pre-switching group 24. At least one part of the flux of force runs via the first power path to the main shaft 12. An optional further part of the flux of force runs via the second power path 29 to the countershaft 13.

The range group 17 is arranged on the output side of the main transmission 11. The range group 17 is arranged coaxially to the main shaft 12. The range group 17 has exactly three shafts 18, 20, 21, namely a first shaft 18, a second shaft 20 and a third shaft 21. The range group 17 has a first shaft 18 connected non-rotationally to the main shaft 12. The first shaft 18 is formed as a solid shaft. The first shaft 18 is advantageously formed integrally with the main shaft 12. Thus, the first shaft 18 is arranged coaxially to the main shaft 12 and is non-rotationally connected to it. Furthermore, the range group 17 has a second shaft 20 non-rotationally connected to a transmission output shaft 19. The second shaft 20 is formed from a solid shaft. Furthermore, the range group 17 has a third shaft 21. The third shaft 21 is formed from a hollow shaft. The range group 17 is designed in a planetary construction. The range group 17 has a planetary gearset P1. The planetary gearset P1 is formed as a simple planetary gearset. The planetary gearset P1 is arranged on a third toothed gear plane Z3 of the toothed gear planes Z1, Z2, Z3. The first planetary gearset P1 forms the third toothed gear plane Z3. The range group 17 has a sun gear P11. The first shaft 18 is non-rotationally connected to the sun gear P11. The range group 17 has a planetary support P12. The second shaft 20 is non-rotationally connected to the planetary support P12. The range group 17 has a hollow gear P13. The third shaft 21 is non-rotationally connected to the hollow gear P13. Furthermore, the range group 17 has several planetary supports P14, which are arranged by the planetary support P12 on an orbit around the sun gear P11. The range group 17 further has a blocking switching unit S5. The blocking switching unit S5 is provided to non-rotationally couple the second shaft 20 to the third shaft 21. The blocking switching unit S5 is provided to block the planetary gearset P1, to non-rotationally couple the second shaft 20 to the third shaft 21.

A first toothed gear plane Z1 of the toothed gear planes Z1, Z2, Z3 lies closest to the transmission input shaft 23 in relation to the remaining toothed gear planes Z2, Z3. The first toothed gear plane Z1 is formed as a simple spur gear plane. A second toothed gear plane Z2 of the toothed gear planes Z1, Z2, Z3 lies closes to the first toothed gear plane Z1 in relation to the remaining toothed gear planes Z3. The second toothed gear plane Z2 is formed as a simple toothed gear plane. The third toothed gear plane Z3 is formed as a planetary gearset plane.

The group transmission device 10 comprises a plurality of switching units S1, S2, S3, S4. The group transmission device 10 comprises four switching units S1, 2, S3, S4 and a blocking switching unit S5. The blocking switching unit S5 is arranged axially behind the planetary gearset P1 of the third toothed gear plane Z3 when viewed in the moment current direction 31. The blocking switching unit S5 is arranged axially between the planetary gearset P1 and the output toothed gear 30 when seen in the moment current direction 31. The blocking switching unit S5 is arranged coaxially to the main shaft 12.

The group transmission device 10 further has a first switching unit 51. The first switching unit S1 is arranged axially behind the planetary gearset P1 of the third toothed gear plane Z3 when see in the moment current direction 31. The first switching unit S1 is arranged axially between the planetary gearset P1 and the output toothed gear 30 when seen in the moment current direction 31. The first switching unit 1 is arranged coaxially to the main shaft 12. The first switching unit S1 is provided to non-rotationally connect the third shaft 21 to the housing 22.

The first switching unit 51 and the blocking switching unit S5 are merged to form a double switching unit with a single sliding sleeve S11. The double switching unit is formed as a claw switching unit. The double switching unit has the sliding sleeve S11 as the switching element. The sliding sleeve S11 is formed axially shiftably via an actuator not visible in further detail. The double switching unit has three coupling elements 32, 33, 34. A first coupling element 32 of the coupling elements 32, 33, 34 is arranged axially in front of a second coupling element 33 of the coupling elements 32, 33, 34 when seen in the moment flow direction 31. The second coupling element 33 is arranged axially in front of a third coupling element 34 of the coupling elements 32, 33, 34 when seen in the moment flow direction 31. The first coupling element 32 of the double switching unit is permanently non-rotationally connected to the housing 22. The second coupling element 33 of the double switching unit is permanently non-rotationally connected to the third shaft 21. The third coupling element 34 is permanently non-rotationally connected to the transmission output shaft 19 and the second shaft 20.

The double switching unit has three switching positions. The double switching unit has a first switching position. The double switching unit is provided to non-rotationally connect the third shaft 21 to the housing 22 in the first switching position. In the first switching position of the double switching unit, the first coupling element 32 and the second coupling element 33 are coupled via the sliding sleeve S11.

The double switching unit has a second switching position. The double switching unit is provided to block the planetary gearset P1 in the second switching position. The double switching unit is provided to non-rotationally couple the planetary support P12 of the planetary gearset P1 to the hollow gear P13 of the planetary gearset P1 in the second switching position. In the second switching position of the double switching unit, the second coupling element 33 and the third coupling element 34 are coupled via the sliding sleeve S11.

The double switching unit has a neutral switching position. In the neutral switching position, the double switching unit does not function. In the neutral switching position of the double switching unit, no coupling of the coupling elements 32, 33, 34 of the double switching unit by the sliding sleeve S11 takes place. In the neutral switching position of the double switching unit, the sliding sleeve S11 of the double switching unit is only coupled to the second coupling element 33 of the double switching unit.

The group transmission device 10 comprises the second switching unit S2. The second switching unit S2 is arranged axially in front of the planetary gearset P1 when seen in the moment current direction 31. The second switching unit S2 is arranged axially behind the second toothed gear plane Z2 when seen in the moment current direction 31. The second switching unit S2 is arranged coaxially to the main shaft 12. The second switching unit S2 has a switching element S21. The switching element S21 is formed as a sliding sleeve. The second switching unit S2 is provided to non-rotationally connected the third shaft 21 to the first spur gear 15. The second switching unit S2 is provided for non-rotationally connecting the hollow gear P13 of the range group 17 to the first spur gear 15 of the spur gear pair 14. The second switching unit S2 is provided to couple the hollow gear P13 of the range group 17 to the second spur gear 16 of the spur gear pair 14. The second switching unit S2 has two switching positions. The second switching unit S2 has a first switching position. The second switching unit S2 is provided to non-rotationally connect the hollow gear P13 of the range group 17 to the first spur gear 15 of the spur gear pair 14 in the first switching position and thus to couple the hollow gear P13 of the range group 17 to the countershaft 13. The second switching unit S2 has a neutral switching position. In the neutral switching position, the second switching unit S2 does not function.

The group transmission device 10 comprises a third switching unit S3. The third switching unit S3 is arranged axially behind the further spur gear pair 26 when seen in the moment current direction 31. The third switching unit S3 is arranged axially in front of the spur gear pair 14 when seen in the moment current direction 31. The third switching unit S3 is arranged coaxially to the main shaft 12. The third switching unit S3 is provided to non-rotationally connect the first spur gear 15 to the first shaft 18 of the range group 17. The third switching unit S3 is provided to couple the main shaft 12 to the second spur gear 16.

The third switching unit S3 is formed as a claw switching unit. The third switching unit S3 has a further switching element S31. The further switching element S31 is formed from a sliding sleeve. The third switching unit S3 has three coupling elements 35, 36, 37. A first coupling element 35 of the coupling elements 35, 36, 37 is arranged axially in front of a second coupling element 36 of the coupling elements 35, 36, 37 when seen in the moment current direction 31. The second coupling element 36 is arranged axially in front of a third coupling element 37 of the coupling elements 35, 36, 37 when seen in the moment current direction 31. The first coupling element 35 of the third switching unit S3 is permanently non-rotationally connected to the third spur gear 27 of the further spur gear pair 26. The second coupling element 36 of the third switching unit S3 is permanently non-rotationally connected to the main shaft 12. The third coupling element 37 is permanently non-rotationally connected to the first spur gear 15 of the spur gear pair 14.

The third switching unit S3 has three switching positions. The third switching unit S3 has a first switching position. The third switching unit S3 is provided to non-rotationally connect the third spur gear 27 of the further spur gear pair 26 to the main shaft 12 in the first switching position. In the first switching position of the third switching unit S3, the first coupling element 35 and the second coupling element 36 are coupled via the further switching element S31.

The third switching unit S3 has a second switching position. The third switching unit S3 is provided to non-rotationally connect the first spur gear 15 of the spur gar pair 14 to the main shaft 12 in the second switching position. In the second switching position of the third switching unit S3, the second coupling element 36 and the third coupling element 37 are coupled via the further switching element S31.

The third switching unit S3 has a neutral switching position. In the neutral switching position, the third switching unit S3 does not function. In the neutral switching position of the third switching unit S3, there is no coupling of the coupling elements 35, 36, 37 of the third switching unit S3 by the further switching element S31. In the neutral switching position of the third switching unit S3, the further switching element S31 of the third switching unit S3 is coupled only to the second coupling element 36 of the third switching unit S3.

The group transmission device 10 has several gear forming possibilities. The group transmission device 10 has at least four gear forming possibilities, wherein further gear forming possibilities independent of the gear forming possibilities and not carried out can be switched, in particular via the pre-switching group 24.

With a first gear forming possibility, the double switching unit is in a second switching position, the second switching unit S2 is in a first switching position and the fourth switching unit S4 is open, such that a power flow takes place via the countershaft 13.

In a second gear forming possibility, the double switching unit is in a neutral switching position, the second switching unit S2 is in a first switching position and the fourth switching unit S4 is closed. The second gear forming possibility forms a power-branched gear, wherein a power branching is carried out in a front planetary gear, not depicted in more detail, of the pre-switching group 24 and a power numeration is carried out in the planetary gear set P1 of the range group 17.

In a third gear forming possibility, the double switching unit is in a first switching position, such that the hollow gear P13 is decelerated, the second switching unit S2 is in a first switching position, such that the countershaft 13 is also decelerated, and the fourth switching unit S4 is closed. The third gear forming possibility forms a quick gear via the main shaft 12.

In a fourth gear forming possibility, the double switching unit is in a first switching position, such that the hollow gear P13 is decelerated, the second switching unit S2 is in the neutral switching position and the fourth switching unit S4 is opened, such that a power flow takes place via the countershaft 13.

The spur gear pair 14 is thus available for a power-branched gear, in particular the second gear forming possibility, and for a conventional gear, in particular the fourth gear forming possibility.

If the double switching unit is in a first switching position, the range group 17 is in a "range low" state. Here, the gear plane can be used by the third switching unit S3 as a separate gear. In order to provide the range group 17 as a fast switch, the spur gear pair 14 is coupled to the hollow gear P13 in the group transmission device 10 by means of the switching element S21 of the second switching unit S2. Thus, the countershaft 13 is also directly coupled to the hollow gear P13 and indirectly to the housing 22. Now, there is a fast gear of the main transmission 11.

With a switch via the group, the double switching unit is brought into a neutral switching position with torsional freedom. This is carried out either by regulating the motor moment to zero or by increasing a torsional moment on the countershaft 13 or reducing the torsional moment on the main shaft 12. Then, the rotation speed adjustment to the closest target gear and the switch of the double switching unit into the second switching position is carried out.

A change of gear in the quick group is carried out, in particular, by switching the second switching unit S3 into the neutral switching position. A load switching can here be carried out by reducing the rotational moment on the countershaft 13.

Switching back is carried out in the opposite order in particular.

LIST OF REFERENCE CHARACTERS

Group transmission device
11 Main transmission
12 Main shaft
13 Countershaft
14 Spur gear pair
15 Spur gear
16 Spur gear
17 Range group
18 Shaft
19 Transmission output shaft
20 Shaft
21 Shaft
22 Housing
23 Transmission input shaft
24 Pre-switching group
25 Shaft
26 Spur gear pair
27 Spur gear
28 Spur gear
29 Power path
30 Output toothed gear
31 Moment current device
32 Coupling element
33 Coupling element
34 Coupling element
35 Coupling element
36 Coupling element
37 Coupling element
P1 Planetary gearset
P11 Sun gear
P12 Planetary support
P13 Hollow gear
P14 Planetary gear
S1 Switching unit
S11 Shifting sleeve
S2 Switching unit
S21 Switching element
S3 Switching unit
S31 Further switching element
S4 Switching unit
S5 Blocking switching unit
Z1 Toothed gear plane
Z2 Toothed gear plane
Z3 Toothed gear plane

The invention claimed is:

1. A group transmission device, comprising:
   a main transmission (11) which has a main shaft (12), a countershaft (13) and a spur gear pair (14) which comprises a first spur gear (15) arranged coaxially and axially overlapping with the main shaft (12) and a second spur gear (16) arranged coaxially and axially overlapping with the countershaft (13);
   a range group (17) arranged coaxially to the main shaft (12) in a planetary construction which has a first shaft (18) non-rotationally connected to the main shaft (12), a second shaft (20) non-rotationally connected to a transmission output shaft (19), a third shaft (21) and a blocking switching unit (S5);
   a first switching unit (S1) provided to non-rotationally connect the third shaft (21) to a housing (22);
   a second switching unit (S2) which has exactly one axially shiftable switching element (S21) and which is provided to non-rotationally connect the third shaft (21) to the first spur gear (15);
   a transmission input shaft (23), wherein the main shaft (12) is coupled or is couplable non-rotationally to the transmission input shaft (23); and
   a third switching unit (S3) which has exactly one axially shiftable further switching element (S31) and which is provided to non-rotationally connect the first spur gear (15) to the first shaft (18) of the range group (17).

2. The group transmission device according to claim 1, wherein the range group (17) has exactly three shafts (18, 20, 21) comprising the first shaft (18), the second shaft (20) and the third shaft (21).

3. The group transmission device according to claim 1, further comprising a pre-switching group pre-switched before the main shaft (12) which has a further shaft (25) which is non-rotationally connected to the main shaft (12) or is connectable by a fourth switching unit (S4).

4. The group transmission device according to claim 3, wherein the pre-switching group (24) has a power path (29) and wherein the pre-switching group (24) is coupleable directly to the countershaft (13) of the main transmission (11) via the power path (29).

5. The group transmission device according to claim 1, wherein the further switching element (S31) of the third switching unit (S3) is provided to couple the main shaft (12) to the second spur gear (16).

6. The group transmission device according to claim 1, wherein the range group (17) has a sun gear (P11) and wherein the first shaft (18) is non-rotationally connected to the sun gear (P11).

7. The group transmission device according to claim 1, wherein the range group (17) has a planetary support (P12) and wherein the second shaft (20) is non-rotationally connected to the planetary support (P12).

8. The group transmission device according to claim 1, wherein the range group (17) has a hollow gear (P13) and wherein the third shaft (21) is non-rotationally coupled to the hollow gear (P13).

9. The group transmission device according to claim 1, wherein the blocking switching unit (S5) is provided to couple the second shaft (20) non-rotationally to the third shaft (21).

10. The group transmission device according to claim 1, wherein the main shaft (12) is a solid shaft.

11. The group transmission device according to claim 1, wherein the first switching unit (S1) and the blocking switching unit (S5) are merged to form a double switching unit having a single shifting sleeve (S11).

* * * * *